US008461958B2

(12) United States Patent
Saenz et al.

(10) Patent No.: US 8,461,958 B2
(45) Date of Patent: Jun. 11, 2013

(54) SYSTEM FOR MONITORING AND CONTROL OF TRANSPORT CONTAINERS

(75) Inventors: Jorge E. Saenz, Weston, FL (US); Dennis N. Jump, Denton, TX (US)

(73) Assignee: Wireless Data Solutions, LLC, Weston, FL (US)

( * ) Notice: Subject to any disclaimer, the term of this patent is extended or adjusted under 35 U.S.C. 154(b) by 687 days.

(21) Appl. No.: 11/205,498

(22) Filed: Aug. 17, 2005

(65) Prior Publication Data
US 2007/0040647 A1 Feb. 22, 2007

(51) Int. Cl.
*G05B 23/02* (2006.01)

(52) U.S. Cl.
USPC ............................................. 340/3.1

(58) Field of Classification Search
USPC ............. 340/3.1, 3.31, 3.32, 3.7, 3.71, 3.9, 340/4.3, 5.1; 700/276
See application file for complete search history.

(56) References Cited

U.S. PATENT DOCUMENTS

| | | | |
|---|---|---|---|
| 5,475,597 A | 12/1995 | Buck | |
| 5,499,512 A | 3/1996 | Juriewicz | |
| 5,513,111 A | 4/1996 | Wortham | |
| 5,917,433 A | 6/1999 | Keillor | |
| 5,969,606 A | 10/1999 | Reber | |
| 6,208,253 B1 | 3/2001 | Fletcher | |
| 6,441,747 B1 | 8/2002 | Khair | |
| 6,529,133 B2 | 3/2003 | Tamaoki | |
| 6,553,336 B1 | 4/2003 | Johnson | |
| 6,577,921 B1 | 6/2003 | Carson | |
| 6,609,078 B2 | 8/2003 | Starling | |
| 6,611,229 B2 * | 8/2003 | Muramatsu et al. | ..... 342/357.07 |
| 6,662,642 B2 | 12/2003 | Breed | |
| 6,668,240 B2 | 12/2003 | Singh | |
| 6,675,591 B2 | 1/2004 | Singh | |
| 6,678,255 B1 | 1/2004 | Kuriyan | |
| 6,679,071 B1 * | 1/2004 | Storey et al. | ..................... 62/126 |
| 6,711,496 B2 | 3/2004 | Denton | |
| 6,759,956 B2 | 7/2004 | Menard | |
| 6,823,680 B2 | 11/2004 | Jayanth | |
| 6,826,514 B1 | 11/2004 | Antico | |
| 6,826,607 B1 | 11/2004 | Gelvin | |
| 6,829,486 B2 | 12/2004 | McKenna | |
| 6,862,499 B1 * | 3/2005 | Cretella et al. | ................ 700/299 |

(Continued)

FOREIGN PATENT DOCUMENTS

| | | |
|---|---|---|
| JP | 07-050882 | 2/1995 |
| JP | 2003-035479 | 2/2003 |

*Primary Examiner* — Jennifer Mehmood
*Assistant Examiner* — Yong Hang Jiang
(74) *Attorney, Agent, or Firm* — San Diego IP Law Group, LLP

(57) ABSTRACT

The invention comprises a unit and system for remote monitoring and controlling of various conditions in a container during cargo. The system includes a local wireless or cable (wired) network with a local station and access points positioned in the vicinity of location of containers, a remote central station connected with the Internet and a container-mounted means for monitoring and control of reefer equipment, each of which includes a processor (CPU) and a transceiver of wireless local communication, a GPS-receiver and a transceiver of cellular communication (with all of them being connected to the said processor). In addition the processor (CPU) of the device is connected to the controller of reefer equipment, while the transceiver of wireless local communication is made so that the creation of Personal Area Network (PAN) with mobile electronic devices (e.g., Notebook, Pocket PC, PDA) is possible, and establishment of wireless communication with a communication gateway of the said local network is also possible.

23 Claims, 5 Drawing Sheets

U.S. PATENT DOCUMENTS

| | | | |
|---|---|---|---|
| 2003/0003869 A1* | 1/2003 | Fujii | 455/41 |
| 2004/0174259 A1 | 9/2004 | Peel | |
| 2004/0178880 A1 | 9/2004 | Meyer | |
| 2004/0233054 A1 | 11/2004 | Neff | |
| 2004/0239525 A1 | 12/2004 | Kobayashi | |
| 2004/0249776 A1* | 12/2004 | Horvitz et al. | 706/21 |
| 2004/0252197 A1 | 12/2004 | Fraley | |

* cited by examiner

SYSTEM FOR MONITORING AND CONTROL OF TRANSPORT CONTAINERS

FIELD OF THE INVENTION

The invention relates in general to systems for remote monitoring and control of parameters of objects. In particular, the invention relates to systems for monitoring and control of various conditions in transport containers.

BACKGROUND OF THE INVENTION

Real time monitoring over the state of cargo is especially important in long-distance transport of various goods by vessels, trucks or by railway transport. To preserve the goods during transportation, it is desirable to maintain various parameters, such as, temperature inside a container within a specified range. In addition to temperature, it may be desirable to maintain humidity, gas composition and other parameters inside container within a specified range.

One example of such monitoring is a telemetry system measuring one or more parameters within a transport container and transmitting a signal indicating the value or values of the one or more measured parameters, or of the status of the respective transport container. Such signal transmission occurs via at least one communication network. This system includes a receiving station connected to the communication network, sensor-based means for monitoring intended for the reception of a signal corresponding to the measured parameters. The system also includes mobile monitoring subsystem installed on the container or inside it and generating a signal corresponding to the values of measured parameters or to the container status. If the measured parameters stay within predetermined limits, the subsystem generates a status signal indicating that the system is operating properly. When the measured parameters fall outside these limits, the subsystem generates a signal indicating the values of measured parameters. Also, such subsystem includes a local communication means for transmitting a signal to a reception station and means of monitoring usage of at least one communication network.

Another example is a system capable of adjusting the temperature in the container cargo compartment under the control of the refrigerator controller. This system performs remote control of the reefer equipment operation using the networks of short-range radio communication and cellular communication networks. However, this system has limited functional capabilities, because it is a specialized system with two communication channels without reprogramming ability. Moreover, short range communication can be performed only with specialized control panel. This system can not provide remote monitoring and control if cellular network is unavailable.

In the systems intended for remote monitoring and control of refrigerator transport containers equipment, gathering of information on equipment operation, transmission of collected information to the central station, and reception of instructions for the correction of perishable goods transportation conditions is usually carried out by a special computerized unit—namely, reefer equipment monitoring and control device, which is located inside or outside the container. Different designs of such devices are known.

For example, a monitoring terminal device including a sensors unit, a unit for wireless signal transmission connected to the sensors unit, and a power source (in particular, a solar battery could be used as such) with a control unit for said power source is known. The device is intended only for remote control of different devices; however, it is incapable of controlling the modes of their operation.

Another example is a wireless monitoring unit which includes sensors, a microprocessor, a memory unit intended for storage of data and programs for microprocessor, a power source, and a radio transceiver intended for the transmission of commands received from information sensors and for the reception of commands and data from a user. This device is unable to control the reefer equipment operation.

Another example of a device includes a monitoring unit connected to the reefer equipment of a container and receiving current information on the conditions of perishable goods within container from the reefer equipment. The device also includes a memory unit intended for the storage of current information, a transceiver for short-range and long-range radio communication with the control unit and a unit for identification of container location based on GPS-receiver. This device is unable to control the reefer equipment operation directly based on signals received from the remote central station.

Yet another example of a device includes a local communication transmitter, a cellular communication transmitter, a local communication receiver, and a cellular communication receiver. However, this device has limited functional capabilities. For example, short range communication can be performed only with specialized control panel. This device can not provide remote monitoring and control if cellular network is unavailable.

SUMMARY OF THE INVENTION

The present invention includes a unit and a system providing remote bidirectional monitoring and controlling of a container equipment, as well as the conditions inside the container, throughout the entire period of container transportation irrespective of its location. For example, in a container yard, or in the sea, or on the road—in the case when it is transported by a truck or vessel and irrespective of the location of an operator monitoring the status and travel of the cargo or controlling reefer equipment and determining the container's location.

The key component of the system is a device (also called a "unit" in the following description) for monitoring and controlling conditions in a container. The unit is also used for communicating with the equipment of the container when testing or repairs of the equipment are needed. The unit comprises a microprocessor coupled to a first port for bidirectional communication with a controller disposed inside the container and to a second port for long range wireless communication. The unit also comprises a transceiver of local wireless communication coupled to the microprocessor and a transceiver of long-range wireless communication coupled to the microprocessor. Furthermore, the unit has the means for monitoring and controlling conditions in the container by detecting whether the local wireless communication and/or the long range wireless communication is an available type of communication and establishing the available type of communication between the unit and a condition-controlling communication device. In the case of a system, the condition-controlling communication device establishes communication via a communication gateway, connecting the unit to the available type of communication.

In particular, the unit detects the available type of communication such as local wireless communication occurring via an 802.11 (Wi-Fi) and/or an 802.15 (Bluetooth) and/or Zig-Bee LAN, which can be set up on a vehicle or a ship. The condition-controlling communication device can be a computer or any mobile devices which can bidirectionally communicate with the unit directly or via the communication gateway. For example, the mobile device could be a PDA, a mobile phone or any other device as a certain application can call for.

The system of monitoring and control of containers comprises at least one local wireless or cable network, which has at least one access point located in close vicinity to the location of a set of containers, at least one local station, which is able to communicate with the local network, a remote central station, which can be connected to the global web Internet, and at least one device for monitoring and control of reefer equipment. Each of the devices for monitoring and control of reefer equipment is made in such a way that it can be installed on a container or inside it and includes a processor (CPU) plus a transceiver of wireless local network, a GPS-receiver and a transceiver of cellular communication, with all said devices being connected to the said processor. The processor (CPU) of reefer equipment monitoring and control device is connected to the reefer equipment controller, while the transceiver of wireless local communication network is made in such a way that it can create a Personal Area Network (PAN) with mobile electronic devices (e.g., Notebook, Pocket PC, PDA), and that there is a possibility of wireless communication with the access points of the said local network.

In a particular embodiment, the unit can comprise such means of communication, as a transceiver of wireless local communication, a GPS-receiver and a transceiver of cellular communication operated by the processor (CPU), which also operates controller of the container's equipment. Combined with different local networks (specially created networks or existing ones), as well as with cellular and satellite networks and the Internet, the means of communication of the device for reefer equipment monitoring and control provides the remote monitoring of the status and travel of the cargo and control of reefer equipment of container during the entire period of cargo transportation and storage, which is done irrespectively of the container location and the location of an operator, who monitors the status and travel of cargo and controls the container reefer equipment. In addition, the control over reefer equipment can be effected both remotely from a remote central station or from another computer, which has access to the Internet and from a local network computer, which can be connected to the appropriate transceiver of wireless local communication of the device for reefer equipment monitoring and control, as well as from a mobile device of Notebook or Pocket PC type equipped with a means for wireless communication able to create a personal network with the said transceiver of wireless local communication.

For example, in the case of container overland transportation by a truck, the operation of the system is provided for by all three types of means of communication of the device. The location of a container is determined by a GPS-receiver. The container's coordinates, as well as the data on temperature in the container and other parameters of the cargo compartment are transmitted (using a transceiver of cellular communication) to the cellular communication network and further—to the Internet to which a remote central station or another remote computer is connected. An operator (or automated system of monitoring and control) received the data and gives the appropriate commands to control the operation of equipment or change the conditions in the container to the unit in that container. These commands are first received by cellular communication transceiver (via Internet and further, via cellular communication network) and then processed by the processor (CPU) of the unit, which then generates the appropriate control signals for the controller.

In addition, a truck driver can also take part in the control over the conditions inside a container and the equipment inside the container. In this case data regarding the temperature and other parameters of the cargo compartment of the container and of the equipment and/or appropriate information and control commands received from the remote central station are transmitted by a transceiver of wireless local network to driver's mobile communication device, since as a PDA, for example, via a peer-to-peer link or via a network established between these two devices. Guided by the received information, the driver uses the mobile communication device to enter the appropriate commands, which are transmitted via the network, processed by the processor (CPU) of the unit, and then sent to the controller.

When a container is transported by a vessel, the system provides communication between a remote central station and a transceiver of wireless local communication of the unit of each container through Internet using a satellite communication system, which is available on board the vessel. A local wireless or cable network, with access points located in close vicinity to the places of container location is also provided. In this case the geographical position of a container coincides with the location of a vessel, which is determined by its navigational system. Control of data exchange between each container and a remote central station is done by a local station (connected to the above-described local network), and a computer on a vessel may serve as the said local station.

When transported by sea, the data on temperature and other parameters of a cargo compartment and on functioning of reefer equipment of an individual container placed on a vessel are transmitted (using a transceiver of wireless local communication of the monitoring and control device) over the vessel network to a vessel computer and further, by means of satellite communication to the Internet, access to which has a remote central station or another remote computer. The control over operation of reefer equipment of a given container is effected in reverse succession over the Internet, using the satellite communication and the local vessel network, with which the processor (CPU) of the device for reefer equipment monitoring and control that generates control signals for the controller of reefer equipment is connected through the access points by means of transceiver of wireless local network.

Besides, the control over reefer equipment operation can be effected from a vessel computer over vessel network or from a mobile PDA over the personal network arranged if necessary as described above. The ship's stowage plan and the local vessel network is used to determine the exact position of the container on vessel, which is displayed by the local station on the vessel.

If a container is at locations where containers are gathered or clustered, such as a container yard, packing station, distribution or wholesale depot, etc. the system provides communication between a remote central station and transceiver of wireless local communication of the device for monitoring and control of reefer equipment of each container through Internet using the available communication channels (e.g. cable channels). GPS-receiver, which is a component of the device for reefer equipment monitoring and control, can be used as an additional means for precise determination of this container location on a container yard by the personnel of this yard and by truck drivers. As it is the case with transportation by sea, the communication of each set of containers located at a container yard with the Internet is provided by a local wireless or cable network, the access points of which are located in close vicinity from the place of container location. Local network of container yard equipped with appropriate access points for wireless communication can be used as such network. Control over data exchange between each container and a remote central station is provided by a local station included in this network (a container yard computer can be used as such local station). In addition to the GPS receiver, the system also utilizes the local network address of the access points to help determine the location of the container at the container yard.

Data on temperature and other parameters of cargo compartment and on operation of reefer equipment of a container located at a container yard are transmitted (using a transceiver of wireless local communication of the device for monitoring and control) over a local network into a computer of container yard and further, to the Internet, a remote central station or another remote computer having access to the said Internet. The control over the operation of reefer equipment of a given container is effected in reverse succession through the Internet and the local network of container yard, with which the processor (CPU) of the device for reefer equipment monitoring and control generating control signals for the controller of reefer equipment is connected via access points by means of transceiver of a wireless local network.

In addition, the control over reefer equipment operation can be effected from a computer of container yard via its local network or from a mobile PDA through a personal network arranged if necessary as described above.

Thus, the described system furnishes a possibility of remote monitoring and control over reefer equipment of a transport container throughout the entire period of transportation and storage of container irrespective of its location (e.g. at a container yard or during transportation by a truck or vessel) and irrespective of the location of an operator keeping track of the cargo state and transportation process plus controlling reefer equipment, whether this operator is an employee of a company, which owns the cargo, or an employee of a shipping company.

The system herein claimed can be organized based on existing engineering communication aids, which operate in the accepted standards, in particular, a transceiver of a wireless local network of the device for reefer equipment monitoring and control can operate in the Wi-Fi, Bluetooth or ZigBee standard.

The system may additionally include one or several sensors of container status and ambient conditions. In this case a container is equipped with such sensors in addition to standard equipment and these sensors are made so that they can be connected to an appropriate device for reefer equipment monitoring and control. In particular, sensors of oxygen, carbon dioxide, ethylene, humidity and temperature of atmospheric air can be used as said sensors. Besides, sensors of security alarm can be used as said sensors, which enable to additionally organize electronic system of protecting the container from non-sanctioned penetration.

In the case when communication with access to the Internet is impossible (like cellular communication during transportation by truck or satellite communication during transportation by vessel), the device for reefer equipment monitoring and control can be additionally equipped with its own satellite communication modem.

In addition, the device for reefer equipment monitoring and control can manage external energy dependant devices by means of specific power supply port, controlled by its CPU. E.g. it can activate a strobe light mounted on the container at the container yard, or it can switch on the reefer controller when the reefer is disconnected from power.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

The invention herein claimed is illustrated with the following graphic materials.

DETAILED DESCRIPTION OF THE PREFERRED EMBODIMENTS

Figure 1:
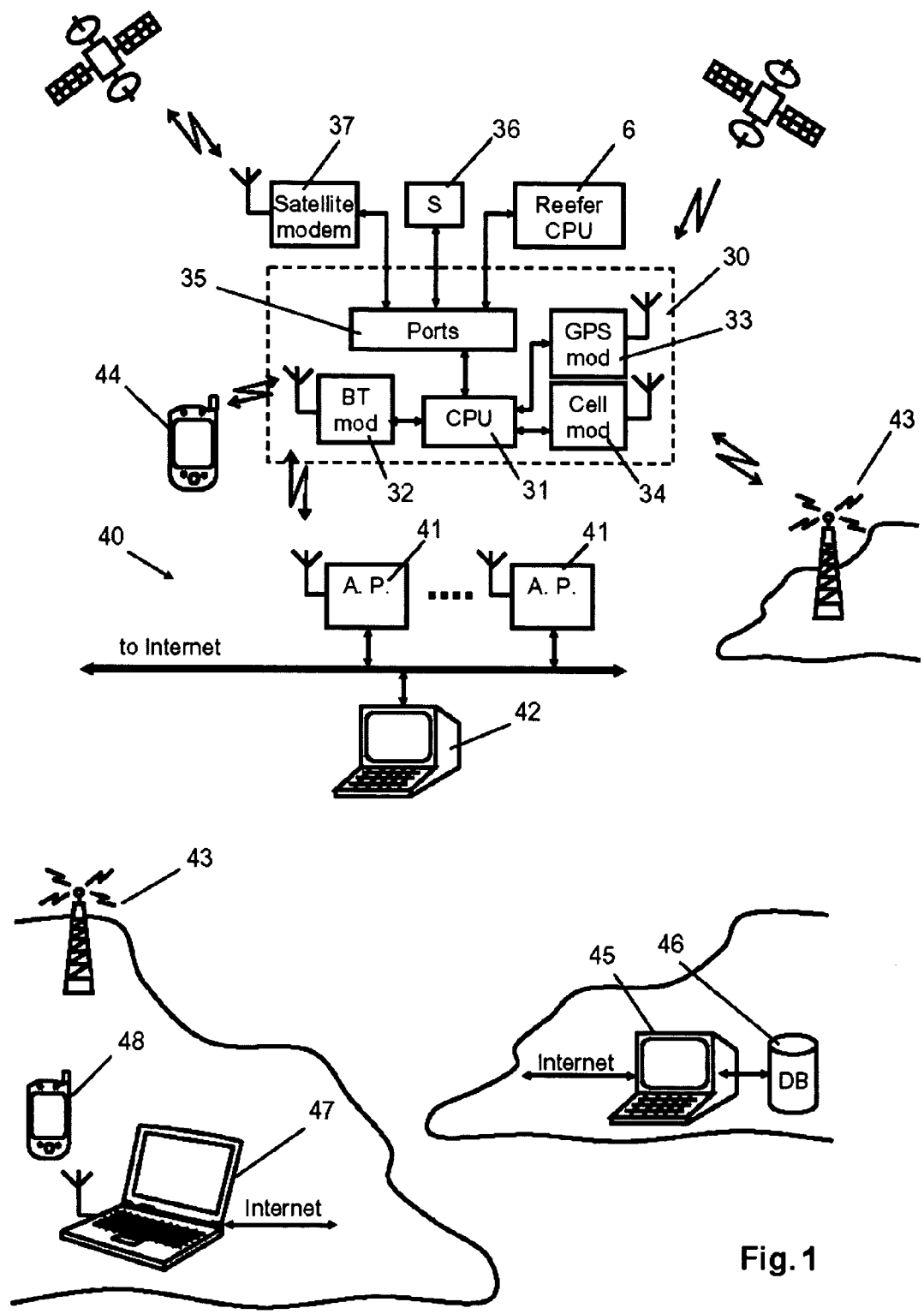
FIG. 1 is a schematic illustration of a system for monitoring and control of the present invention.
Figure 2:
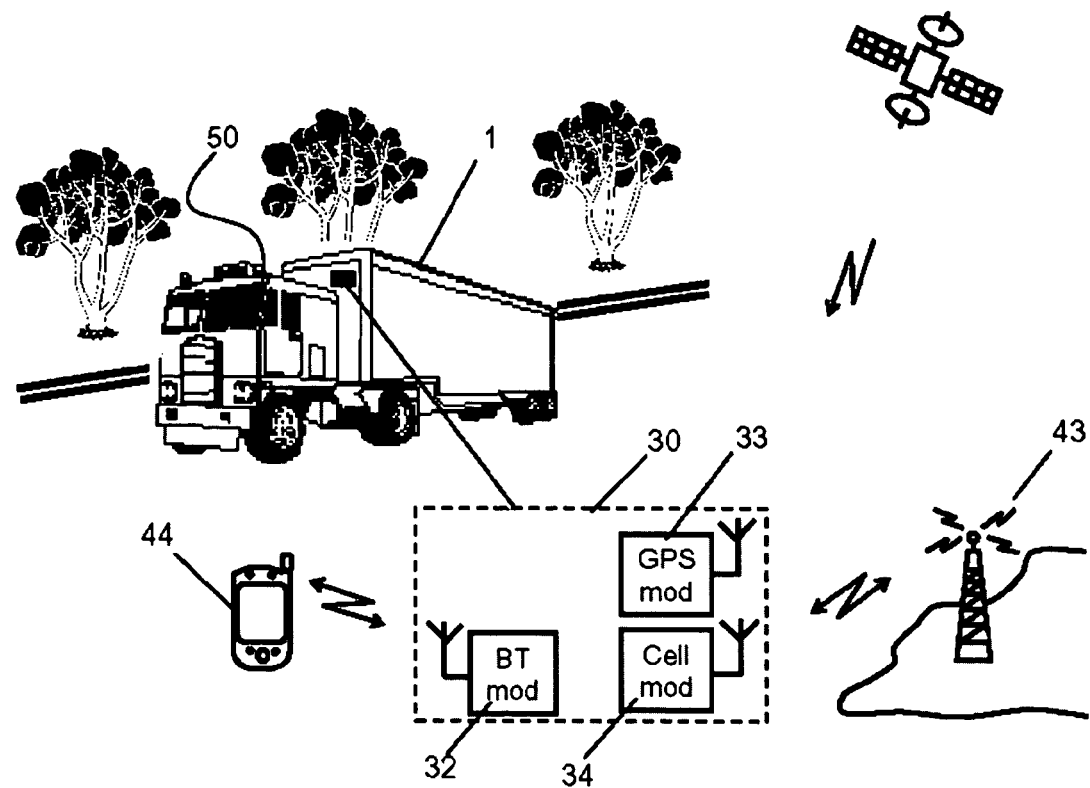
FIG. 2 is a schematic illustration of the a truck-based embodiment of the system
Figure 2:
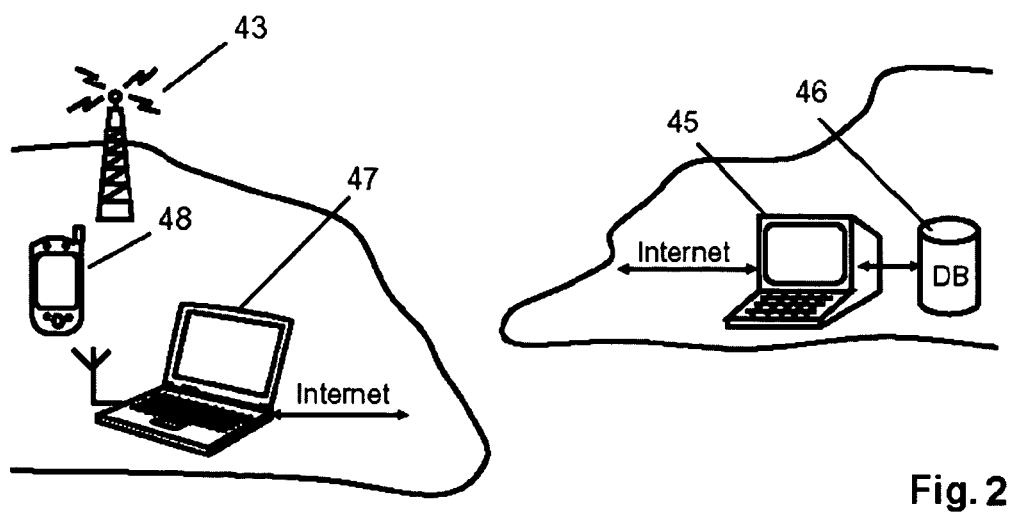
Figure 3:
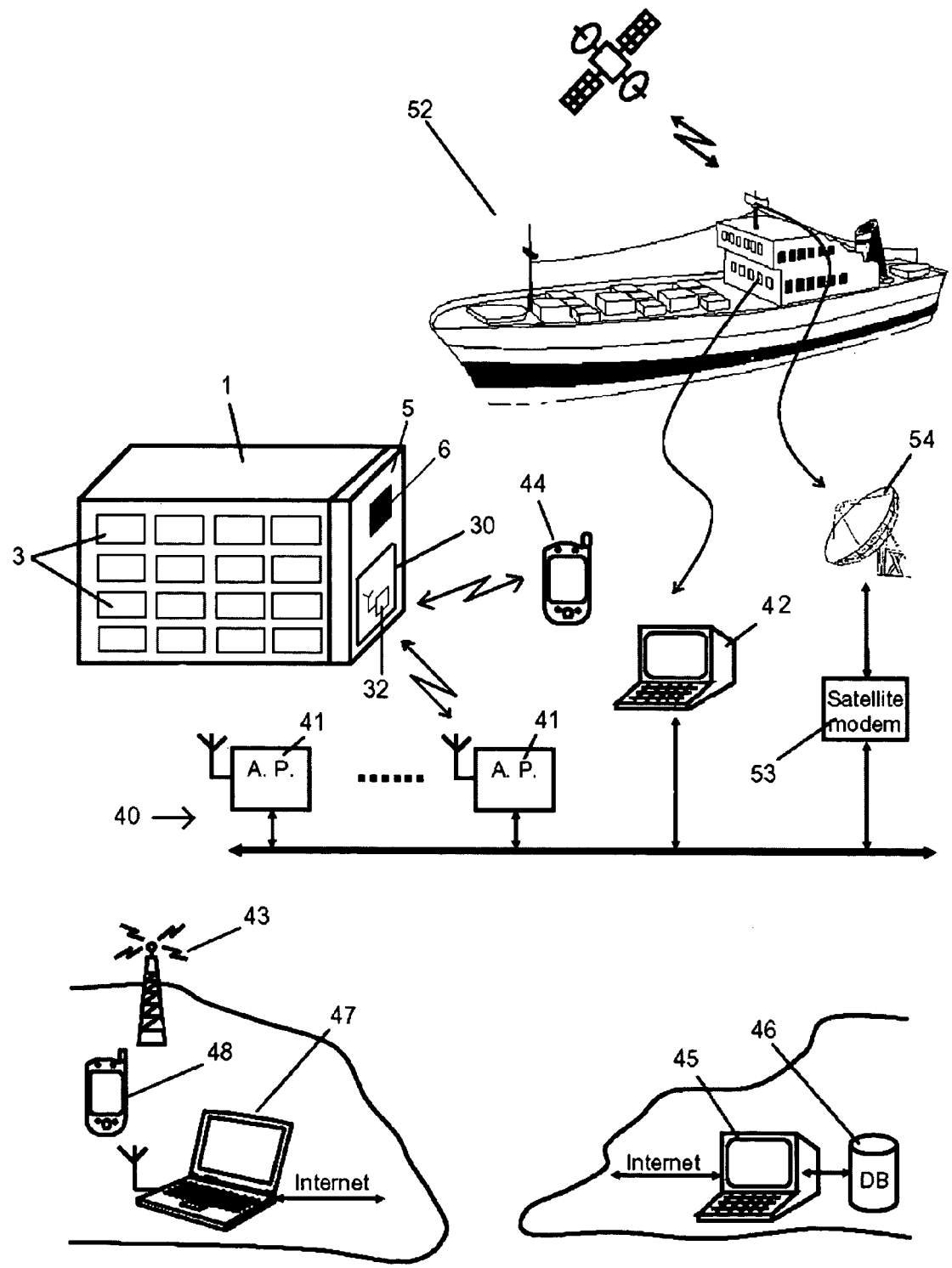
FIG. 3 is a schematic illustration of a vessel-based embodiment of the system.

Turning now to FIGS. 1, 2, and 3, device (unit) 30 for monitoring and controlling of conditions in a container, as well as for controlling the reefer's equipment 5 that are installed on a containers 1 or inside them represent a basis of the system claimed herein (see FIG. 1). The unit can use the power source of the reefer when the power source of the reefer is ON, and a back-up battery when the reefer's power source is OFF. Each of such devices 30 includes processor (CPU) 31 plus wireless local communication transceiver 32, GPS-receiver 33 and cellular communication transceiver 34 (which are connected to processor 31). Device 30 is connected to controller 6 of reefer equipment 5 via port 35 (not shown in FIG. 1). The package of device 30 may additionally include sensors 36 installed inside and/or outside container 1 and intended for recording of parameters characterizing the conditions of storage of cargo 3, the mode of operation of reefer equipment 5, external ambient parameters, state of container 1, and so forth. Also, the package of device 30 may include satellite communication modem 37. Sensors 36 and modem 37 are connected to controller 31 via port 35.

The system also includes local wireless or cable network 40 with access points 41 and local station 42. Access points 41 are located in the vicinity of location of a set of containers 1 (for example, on a vessel or at a container yard) in such a way as to ensure the possibility of wireless communication between transceiver 32 of device 30 and access points 41.

The transceiver 32 is made in such a way as to provide the possibility to create Personal Area Network (PAN) with mobile electronic devices 44 (e.g., Notebook, Pocket PC, PDA).

GPS-receiver 33 receives signals from navigation satellites and determines the location of container 1, on which device 30 is installed. Cellular communication transceiver 34 is intended for the exchange of data through the cellular communication networks (for example, through retransmitter 43 as shown in FIG. 1).

The system also includes remote central station 45 with database 46 on all containers 1. This remote central station is installed permanently and is connected to the Internet. Beside an operator of central station 45, users of other remote computers 47, 48 (which have access to the Internet directly or indirectly through networks of cellular or satellite communication) can have access to the system with an opportunity to receive information on the location of container 1, state of cargo 3 and container 1 and with an opportunity to control reefer equipment 5 of container 1.

Figure 4:
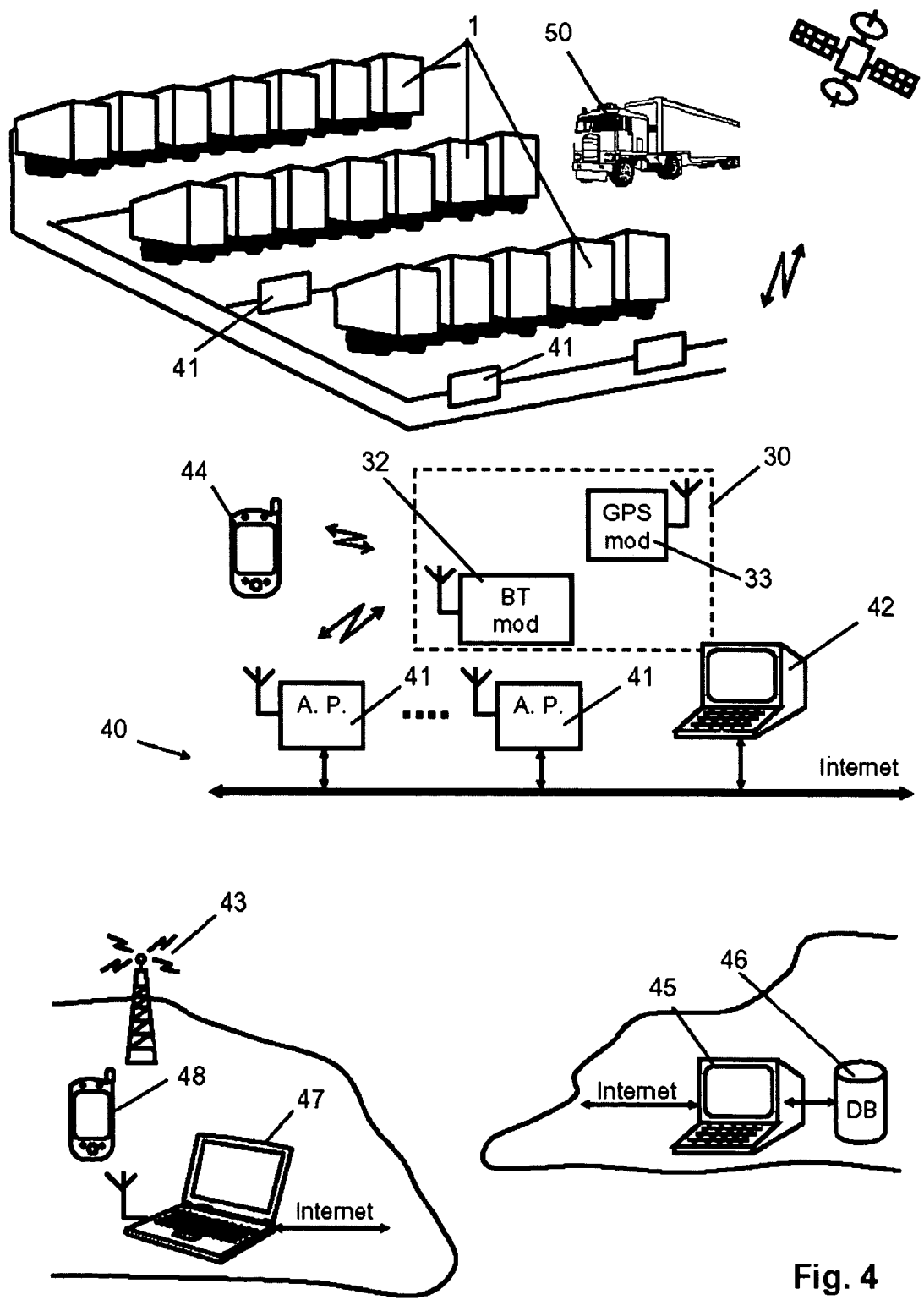
FIG. 4 is a schematic illustration of the container yard-based embodiment of the system.

Universal character of the system is provided due to functional potentialities of device 30 controlled by individual processor (CPU) 31 and installed at each container 1 subject to external control as well as by functional potentialities of other described components of the system. This universal character of the system manifests itself in full in different cases characteristic for container transportation. Such cases are illustrated by FIG. 2-FIG. 4.

FIG. 2 illustrates a case when container 1 equipped with device 30 is transported by truck 50. In this case transceiver 32 creates a personal network with mobile device 44 (Pocket PC) for a driver of truck 50. GPS-receiver 33 enables one to determine the coordinates of container 1 location, while cellular communication transceiver 34 provides for the information exchange by cellular communication networks—specifically, by means of retransmitters 43 that cover the area of truck 50 route.

Since transceivers 32 and 34, as well as GPS-receiver 33 are controlled by common processor (CPU) 31 (see FIG. 1) of device 30, all required modes of control and monitoring of reefer equipment 5 of container 1 during its transportation by truck 50 are provided.

Specifically, by using cellular communication network and then Internet, remote central station 45 (as well as remote computers 47, 48) can receive information both on container 1 location (determined by GPS-receiver 33) and on container 1 state, conditions of cargo 3 storage, mode of reefer equipment 5 operation (all these data are determined by means of appropriate sensors 36 installed on and inside container 1 and connected to processor (CPU) 31 of device 30 via port 35. According to received information, central station 45 or remote computers 47 and 48 can send instructions for controlling reefer equipment 5 of container 1. These instructions can be either sent for execution directly to processor (CPU) 31 connected to controller 6 of reefer equipment 5, or by means of transceiver 32 they can be sent to driver's mobile device 44, and the driver using this very device 44 can send instructions for controlling reefer equipment 5 of container 1.

FIG. 3 illustrates a case when a number of containers 1 (each of which is equipped with device 30) is transported by vessel 52. In this case wireless local communication transceiver 32 communicates with external components of the system. Transceiver 32 can also create a personal network with mobile devices 44 of vessel crew and establish communication with vessel local network 40 using access points 41 for this purpose. Control over reefer equipment 5 in this case can be done both from mobile device 44 and from local station 42 (a vessel station included in network 40 may be used as such local station). The ship's stowage plan and the local network 40 on the vessel 52 can be used to determine the exact position of the container 1 on vessel 52, which is displayed by the local station 42 on the vessel 52. Communication with remote earth central station 45 can be effected by means of a vessel system of satellite communication including satellite modem 53 (connected to network 40) and transmitting satellite antenna 54. Device 30 can be equipped with its own satellite modem 37 connected to processor (CPU) 31 as shown in FIG. 1.

FIG. 4 illustrates the case of arrangement of a set of containers 1 on container yard 56 for storage or batching, each of the said containers being equipped with device 30. In this case the communication with external components of the system is performed by transceiver 32 of wireless local communication. Device 32 can create a personal network with mobile devices 44 of the personnel of container yard 56 as well as to establish communication with local network 40 of this container yard 56 through access points 41. Control over reefer equipment 5 in this case can be effected both from mobile device 44 and from local station 42 (a station of container yard 56 included in network 40 may serve as such local station). Since local network 40 of container yard 56 usually has communication with the Internet, the communication with remote central station 45 also communicating with the Internet does not present any difficulties. Access points 41 and GPS-receiver 33, which is included in device 30, can be used as a means for accurate localization of a particular container at container yard 56 by the personnel of this container yard and by truck drivers.

Figure 5:
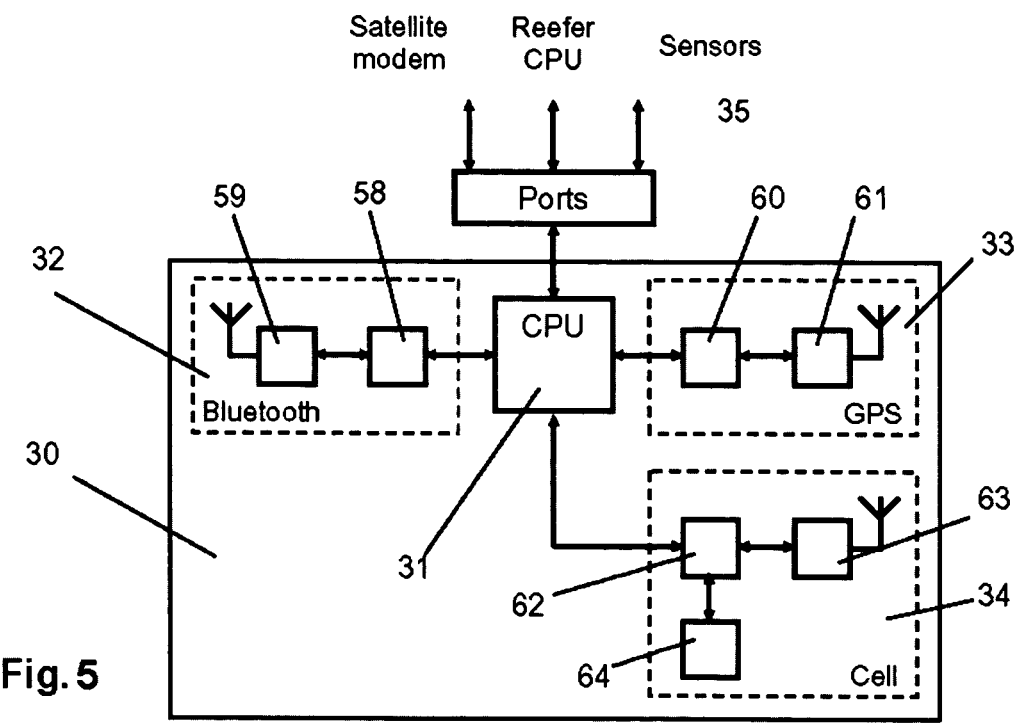
FIG. 5 is a structural diagram of unit for monitoring and controlling

Device 30 installed on containers 1 or inside them (see FIG. 5) includes processor (CPU) 31 plus transceiver 32 of wireless local communication, GPS-receiver 33 and transceiver 34 of cellular communication, with all of them being connected to processor (CPU) 31. In the general case transceiver 32 of wireless local communication includes transceiver 58 and antenna unit 59, GPS-receiver 33 includes receiver 60 and antenna unit 61, and transceiver 34 of cellular communication includes transceiver 62, antenna unit 63 and a slot for SIM-card installation. Device 30 is connected to controller 6 of reefer equipment 5 via port 35. The package of device 30 may additionally include sensors 36 installed inside and/or outside container 1 and intended for recording of parameters characterizing the conditions of storage of cargo 3, operation mode of reefer equipment 5, external ambient parameters, state of container 1, and so forth. The package of device 30 may also include satellite communication modem 37. Sensors 36 and modem 37 are connected to controller 31 through port 35.

Due to centralized control by one processor (CPU) 31 over different means of communication—namely, over transceiver 32 of wireless local communication, GPS-receiver 33, transceiver 34 of cellular communication as well as over satellite communication modem 37, device 30 (at any location of container 1) provides information on its location, conditions of cargo 3 storage and the state of the cargo, state of container 1 proper, on the one hand, and the remote control of reefer equipment 5, on the other hand. In this case the control can be effected in different ways: from remote central station 45 or from other remote computers 47, 48, from local station 42 (in the case of transportation by a vessel or in the case when containers 1 are located at permanent container yards 56), as well as by the personnel servicing containers 1 (for example, by a truck driver by means of mobile devices 44).

The switchover of operation modes of means of communication 32, 33, 34 and 37 of device 30 is performed by processor (CPU) 31 operating under control of specially developed software. The switchover of operation modes automatically takes into account the presence of operating local and personal networks, networks of cellular and satellite communication and other communication systems, which enable to perform the data exchange between device 30 and external computer means (42, 44, 45, 47, and 48). The switchover of operation modes of device 30 can also take into account current quality of communication with the above-indicated communication systems.

Samples of device 30 for monitoring and control of reefer equipment were manufactured and experimental testing of the claimed system was conducted, which proved the attainment of the above-indicated engineering result and advantages of the system as compared to the known systems.

Figure 6:
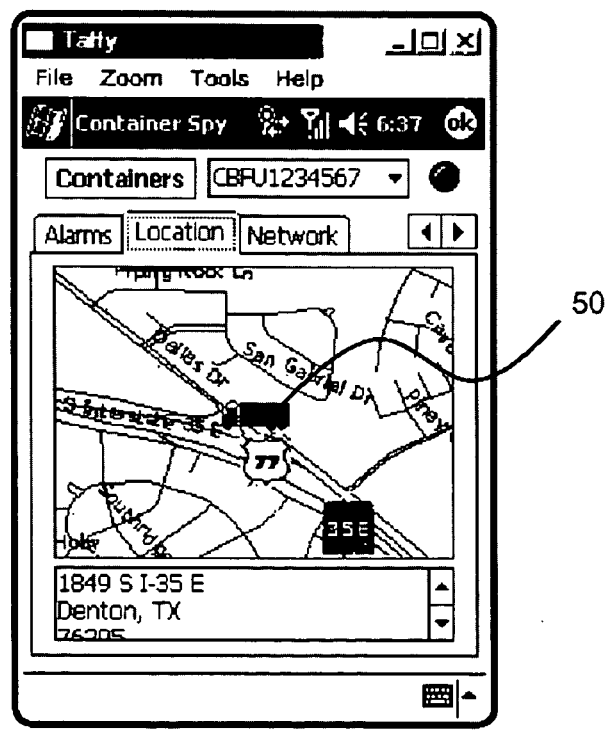
FIG. 6 is a schematic illustration of a condition-controlling device.

An example of remote monitoring of transport container transported by a truck is illustrated in FIG. 6, which shows a Pocket PC with adapter Wi-Fi (802.11), the display of which shows the map of locality and the location of truck 50 with a container.

It is also contemplated by the present invention that the unit can be integrated with the reefer's microprocessor, which can be programmed to function in a similar manner as the unit's dedicated microprocessor described above.

The system of the present invention is also comprised of several software applications which can work independently or as a centralized system. The hub portion of the system is a communication gateway that allows an authorized user access to the network for tracking and controlling containers. The hub portion may be housed at a centralized customer's location behind the customer firewall, which would require a user to clear security information prior to gaining access to the company's network and utilizing the desire software application.

The hub's main function is to communicate with the cellular and satellite data network providers, and to allow users with network-ready (Wi-Fi or GPRS) mobile devices use the desired application to locate, monitor and control a container.

The hub is also a high-level administrator algorithm that maintains updated information on containers, locations, etc. In a centralized mode, the hub may receive real time data from remote computers running the system application at the various locations, as well as the data from the system application on board a ship when this arrives at the port. By gathering the information from all these points, the hub keeps up-to-date information on the registered containers in the system.

The shipboard application of the present system is a method of communicating and managing reefer containers on a ship. This method uses the ship's stowage plan to display each container based on its location on the ship. The shipboard application runs in a dedicated computer on board the ship, which is connected to the ship's local network, as well as to a dedicated satellite modem.

The shipboard satellite module interface of the system displays both incoming and outgoing container-related information. An inquiry from a land-base system is received through a satellite modem installed on the ship and connected to the system's computer on board. The information is automatically sent back through the same path. A graphical user interface displays the types of inquiries and commands that can be sent using this application. Container information can be zipped and sent via email from the ship during voyage on a daily basis or it could be zipped and sent via email the day the ship arrives at the destination port.

The land-base applications of the system are comprised of the steps used for communicating and managing containers either at any fixed location, such as for the container yards, terminal ports, packing stations, satellite pre-trip centers, distribution and/or ripening centers, etc., and the method used for communicating and controlling the reefer container while this is being transported over-the-road either by truck or rail.

The container yard application shows all containers located at the yard. The unit uses its Bluetooth radio to transmit the data packets to the Bluetooth/Wi-Fi Access Server and from here via Wi-Fi to the yard monitoring computer station. Once the container leaves the yard and travels outside the system geo-fence, the unit switches communication from Bluetooth to cellular and triggers a status report that is sent to the yard monitoring computer station. The captured container information is stored in the yard monitoring computer station's database and it is also replicated to a centralized data warehouse.

The land mobile application portion is used to communicate with and manage a reefer container while this is over-the-road. In North America, this is performed through data-only cellular networks, which transmit information to and from the container reefer controller connected to the unit. A graphical user interface will display the container data, inquiries and commands allowed under this application, as well as a digital map showing the location of the container. The unit also has the option to use a quad-band GSM digital cellular radio, which enables over-the-road monitoring in other countries.

The mobile satellite module is the application used to track, communicate, and manage a reefer container while over-the-road using a satellite network. A satellite modem is required for this purpose. The satellite modem (built-in antenna) is attached to the roof of the container and it is connected to one of the unit's serial ports.

The land fixed and mobile modules of the system may be combined into one graphic user interface to simplify. Switching between land-fixed and land mobile modules takes place when a container is picked up by a truck and leaves the container yard for delivery to a customer. As soon as the container leaves the yard, it loses wireless communication with the local area network within the yard. The unit's microprocessor receives this information from the short-range transceiver in the unit and automatically switches communication to the long-range transceiver, which may transmit through a cellular or satellite network.

When the refrigeration unit is OFF for several hours, the unit assumes there is no perishable cargo in the container and enters into a "hibernation" state to conserve battery power. The unit can be programmed to "wake-up" every 24 or 12 hours and report its location and status. Since this can occur inside a container yard, the unit's GPS wakes up first to lock the satellite signal, then the unit tries to communicate through the local wireless network. If not such network is available, the unit reports its location and status using the cellular radio.

The pocket PC (or a mobile device) module is the application used to communicate and manage a reefer container from a very short distance (30 feet max) using a Pocket PC. The corresponding program and license is installed in a Pocket PC, such as a Compaq iPAQ. This application also allows authorized users to connect through the hub and access information, perform inquiries, and send commands to a limited number of containers (this is due to the Pocket PC's memory size). The Pocket PC has networking capabilities (GPRS, Wi-Fi) and service connectivity to the Internet.

While this invention has been particularly shown and described with references to preferred embodiments thereof, it will be understood by those skilled in the art that various changes in form and details may be made therein without departing from the scope of the invention encompassed by the appended claims.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for monitoring and controlling one or more conditions in a transport container, comprising:
   a microprocessor unit coupled to a first bidirectional communication port for communication with a container's controller disposed inside the container, to a second port for communication with a long-range wireless network, and to a third port for communication with a at least one microprocessor unit's sensor of a condition in the container;
   a global positioning module controlled by the microprocessor unit for determining a location of the container;
   a transceiver of local wireless communication controlled by the microprocessor unit;
   a transceiver of long-range wireless communication controlled by the microprocessor unit; and
   means for monitoring and controlling communication by detecting availability of one or more types of communication networks based on the location of the container determined from the global positioning module, selecting one or more available types of communication networks based on the location of the container determined from the global positioning module and establishing communication with or switching over to one or more available types of communication networks between the unit and a condition-controlling one or more remote computer means via a communication gateway;
   wherein the unit is capable of receiving human input data, data from at least one microprocessor unit's sensor of a condition in the container, data from one or more remote computer means, and data from the global positioning module, communicating those data to one or more remote computer means via one or more available types of communication networks, receiving instructions based on those data from one or more remote computer means and allowing one or more computer means to remotely monitor and control one or more conditions in the container or the container's controller during transportation of the container using the transceiver of local wireless communication and the transceiver of long-range wireless communication.

2. The system of claim 1, wherein one or more available types of communication networks is the local wireless communication network occurring via an 802.11 (Wi-Fi) and/or an 802.15 (Bluetooth) and/or ZigBee LAN.

3. The system of claim 2, wherein the LAN is set up on a vehicle or a ship.

4. The system of claim 2, wherein one or more remote computer means is a computer or a mobile device which can bidirectionally communicate with the unit via the communication gateway.

5. The system of claim 1, wherein one or more available types of communication networks is the long-range wireless communication occurring via a cellular and/or satellite and/or 802.16 (WiMax) network.

6. The system of claim 5, wherein one or more remote computer means is a computer or a mobile device which can bidirectionally communicate with the unit via the communication gateway.

7. The system of claim 1, wherein the communication gateway is a server, or an access point, or a modem.

8. The system of claim 1, further comprising a port for coupling the transceiver of the long range wireless communication with a satellite modem.

9. A detachable unit for monitoring and controlling one or more conditions in a transport container, comprising:
   a microprocessor coupled to a first bidirectional communication port for communication with a container's controller disposed inside the container, to a second port for long range wireless communication, and to a third port for communication with a at least one unit's sensor of a condition in the container;
   a global positioning module having an antenna and a connector for coupling to the unit, the module being controlled by the microprocessor and determining a location of the container;
   a transceiver of local wireless communication controlled by coupled to the microprocessor;
   a transceiver of long-range wireless communication controlled by the microprocessor; and
   means for monitoring and controlling communication by detecting availability of one or more types of communication networks based on the location of the container determined from the global positioning module, selecting one or more available types of communication networks based on the location of the container determined from the global positioning module and establishing communication with or switching over to one or more available types of communication networks between the detachable unit and one or more remote computer means via a communication gateway;
   wherein the detachable unit is capable of receiving human input data, data from at least one unit's sensor of a condition in the container, data from one or more remote computer means, and data from the global positioning module, communicating those data to one or more remote computer means via one or more available types of communication networks, and receiving instructions based on those data from one or more remote computer means and allowing one or more remote computer means to remotely monitor and control one or more conditions in the container or the container's controller during transportation of the container using the transceiver of local wireless communication and the transceiver of long-range wireless communication.

10. The unit of claim 9, wherein one or more available types of communication networks is the local wireless communication network occurring via an 802.11 (Wi-Fi) and/or an 802.15 (Bluetooth) and/or ZigBee LAN.

11. The unit of claim 9, wherein one or more available types of communication occurs between the unit and a mobile communication device.

12. The unit of claim 9, wherein one or more available types of communication occurs via a local and/or a long-range communication network.

13. The unit of claim 12, wherein the local network is a wireless 802.11 LAN, or a 802.3 Ethernet LAN, or a wireless 802.15 Bluetooth personal area network (PAN) or a ZigBee network.

14. The unit of claim 12, wherein the long-range network is a cellular network and/or satellite and/or 802.16 (WiMax) network.

15. The unit of claim 9, further comprising a fourth port for coupling the transceiver of the long range wireless communication with a satellite modem.

16. The unit of claim 9, wherein the microprocessor is integrated with the container's microprocessor.

17. The system of claim 1, wherein the microprocessor unit is integrated with the container's microprocessor.

18. The system of claim 1, wherein at least one microprocessor unit's sensor of the condition in the container monitors cargo condition in the container.

19. The unit of claim 9, wherein at least one microprocessor's sensor of the condition in the container monitors cargo condition in the container.

20. The system of claim 1, wherein the microprocessor unit communicates global positioning data to one or more remote computer means to determine position of the container on a vessel or in a container yard.

21. The unit of claim 9, wherein the unit communicates global positioning data to one or more remote computer means to determine position of the container on a vessel or in a container yard.

22. The system of claim 1, further comprising a power supply port, switch, or activator controlled by the microprocessor unit.

23. The unit of claim 9, further comprising a power supply port, switch, or activator controlled by the microprocessor.

* * * * *